(12) United States Patent
Bernat et al.

(10) Patent No.: US 11,146,396 B1
(45) Date of Patent: *Oct. 12, 2021

(54) DATA RE-ENCRYPTION IN A STORAGE SYSTEM

(71) Applicant: Pure Storage, Inc., Mountain View, CA (US)

(72) Inventors: Andrew Bernat, Mountain View, CA (US); Ethan Miller, Santa Cruz, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,852

(22) Filed: Dec. 3, 2019

Related U.S. Application Data

(63) Continuation of application No. 15/402,954, filed on Jan. 10, 2017, now Pat. No. 10,574,454, which is a continuation of application No. 15/399,539, filed on Jan. 5, 2017, now Pat. No. 10,489,307.

(51) Int. Cl.
*H04L 9/08* (2006.01)

(52) U.S. Cl.
CPC .......... *H04L 9/0891* (2013.01); *H04L 9/0894* (2013.01)

(58) Field of Classification Search
CPC .................... H04L 9/0891; H04L 9/0894
See application file for complete search history.

(56) References Cited

U.S. PATENT DOCUMENTS

| 5,706,210 | A  | 1/1998  | Kumano et al.   |
| 5,799,200 | A  | 8/1998  | Brant et al.    |
| 5,933,598 | A  | 8/1999  | Scales et al.   |
| 6,012,032 | A  | 1/2000  | Donovan et al.  |
| 6,085,333 | A  | 7/2000  | DeKoning et al. |
| 6,643,641 | B1 | 11/2003 | Snyder          |
| 6,647,514 | B1 | 11/2003 | Umberger et al. |
| 6,789,162 | B1 | 9/2004  | Talagala et al. |
| 7,089,272 | B1 | 8/2006  | Garthwaite et al. |
| 7,107,389 | B2 | 9/2006  | Inagaki et al.  |
| 7,146,521 | B1 | 12/2006 | Nguyen          |

(Continued)

FOREIGN PATENT DOCUMENTS

| EP | 0725324 A2 | 8/1996 |
| EP | 2026538 A1 | 2/2009 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Hee K Song

(57) ABSTRACT

Periodically re-encrypting user data stored on a storage device, including: detecting that a data encryption key should be decommissioned; and for user data stored on the storage device that is encrypted with the data encryption key: reading the user data that is encrypted with the data encryption key from the storage device; re-encrypting the user data utilizing a current data encryption key; and writing the user data that is encrypted utilizing the current data encryption key to the storage device.

20 Claims, 9 Drawing Sheets

(56) References Cited

U.S. PATENT DOCUMENTS

| | | |
|---|---|---|
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 7,983,423 B1* | 7/2011 | Agarwal ............. H04L 9/16 380/278 |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,370,648 B1 | 2/2013 | Natanzon |
| 8,387,136 B2 | 2/2013 | Lee et al. |
| 8,437,189 B1 | 5/2013 | Montierth et al. |
| 8,465,332 B2 | 6/2013 | Hogan et al. |
| 8,498,417 B1 | 7/2013 | Harwood et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,724,815 B1* | 5/2014 | Roth ................ H04L 63/062 380/270 |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 9,774,445 B1* | 9/2017 | Gandhasri ............. H04L 9/0894 |
| 10,489,307 B2 | 11/2019 | Bernat et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0154705 A1 | 6/2009 | Price, III et al. |
| 2009/0198889 A1 | 8/2009 | Ito et al. |
| 2010/0052625 A1 | 3/2010 | Cagno et al. |
| 2010/0153703 A1 | 6/2010 | Dodgson et al. |
| 2010/0208898 A1* | 8/2010 | Acar .................... H04L 9/0891 380/280 |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0038477 A1* | 2/2011 | Bilodi ................ H04L 9/0891 380/44 |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0244643 A1* | 9/2012 | Yamazaki .......... H01L 51/5212 438/4 |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |

(56) References Cited

U.S. PATENT DOCUMENTS

| | | | |
|---|---|---|---|
| 2015/0149822 A1 | 5/2015 | Coronado et al. | |
| 2015/0186657 A1* | 7/2015 | Nakhjiri | H04L 9/0894 |
| | | | 713/155 |
| 2015/0193169 A1 | 7/2015 | Sundaram et al. | |
| 2015/0310221 A1 | 10/2015 | Lietz et al. | |
| 2015/0378888 A1 | 12/2015 | Zhang et al. | |
| 2016/0098323 A1 | 4/2016 | Mutha et al. | |
| 2016/0300073 A1 | 10/2016 | Pomeroy et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0006018 A1* | 1/2017 | Campagna | H04L 9/088 |
| 2017/0006064 A1* | 1/2017 | Agarwal | H04L 9/3263 |
| 2017/0257214 A1 | 9/2017 | Stufflebeam | |
| 2017/0288871 A1 | 10/2017 | Dimitrakos et al. | |
| 2017/0315740 A1 | 11/2017 | Corsi et al. | |
| 2018/0024942 A1* | 1/2018 | Canepa | H04L 9/0838 |
| | | | 713/193 |
| 2018/0062835 A1 | 3/2018 | Hamel et al. | |
| 2018/0139188 A1* | 5/2018 | Iyer | H04L 9/0894 |
| 2018/0189193 A1 | 7/2018 | Bernat et al. | |

FOREIGN PATENT DOCUMENTS

| | | |
|---|---|---|
| WO | WO-2012/087648 A1 | 6/2012 |
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |
| WO | WO-2018/128737 A1 | 7/2018 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security And Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-Mcintyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express As the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-whitepaper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2017/064183, dated Feb. 8, 2018, 12 pages.

\* cited by examiner

DATA RE-ENCRYPTION IN A STORAGE SYSTEM

CROSS-REFERENCE TO RELATED APPLICATIONS

This application is a continuation application of and claims priority from U.S. patent application Ser. No. 15/402,954, filed Jan. 10, 2017, which is a continuation of and claims priority from U.S. Pat. No. 10,489,307, issued Nov. 26, 2019.

DESCRIPTION OF EMBODIMENTS

Figure 1:
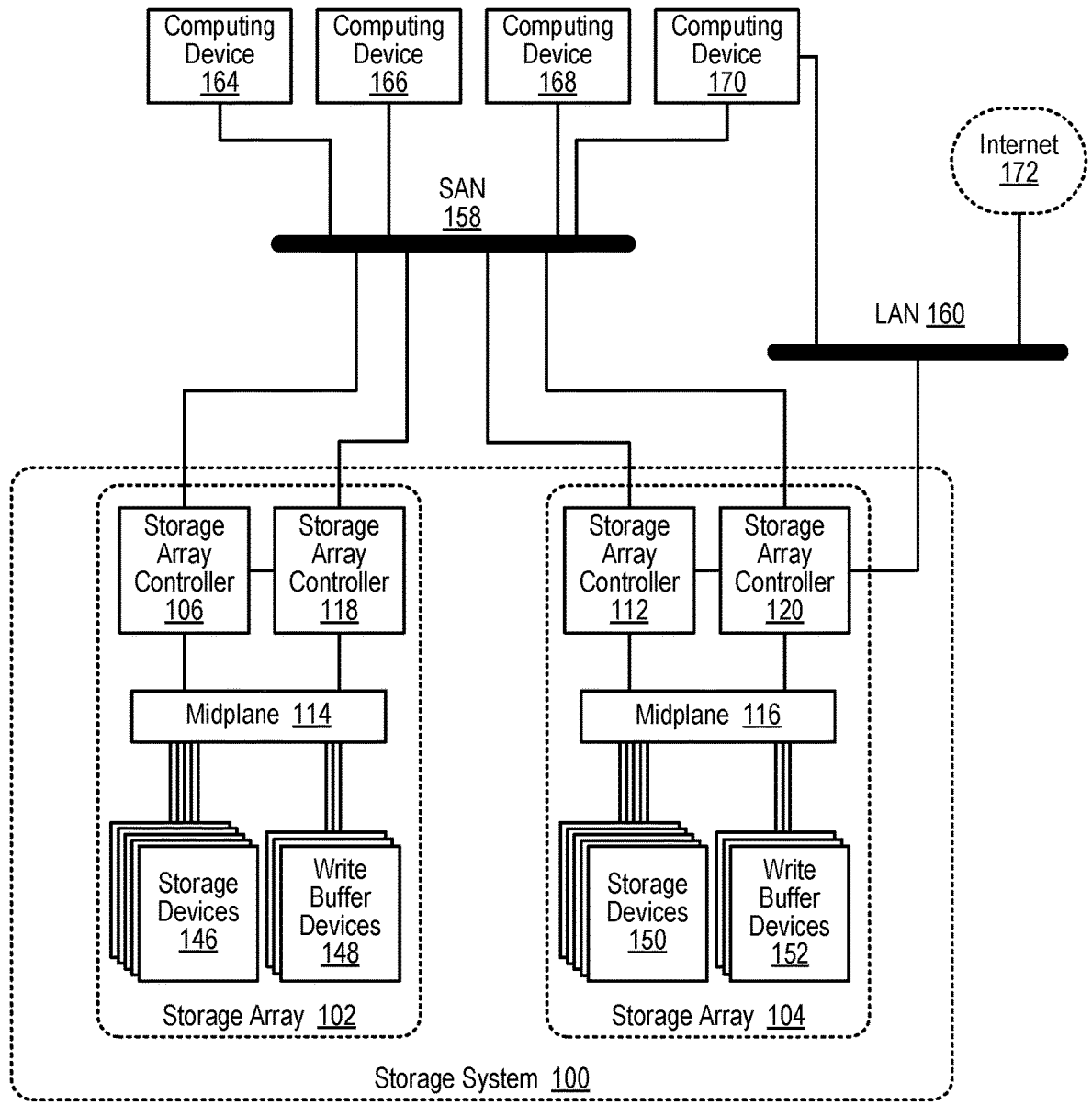
FIG. 1 sets forth a block diagram of a storage system configured for periodically re-encrypting user data stored on a storage device according to embodiments of the present disclosure.

Example methods, apparatus, and products for periodically re-encrypting user data stored on a storage device in accordance with the present disclosure are described with reference to the accompanying drawings, beginning with FIG. 1. FIG. 1 sets forth a block diagram of a storage system (100) configured for periodically re-encrypting user data stored on a storage device according to embodiments of the present disclosure.

The storage system (100) depicted in FIG. 1 includes a plurality of storage arrays (102, 104), although periodically re-encrypting user data stored on a storage device in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network (SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like. In the example depicted in FIG. 1, each of the one or more storage devices (146, 150) may be configured to periodically re-encrypt user data stored on the storage device. Each of the storage device (146, 150) may include firmware that may be executed by a computer processor such as a memory controller, where such firmware includes computer program instructions that, when executed by the computer processor, causes the storage device (146, 150) to: detect that a data encryption key should be decommissioned; and for user data stored on the storage device that is encrypted with the data encryption key: read the user data that is encrypted with the data encryption key from the storage device; re-encrypt the user data utilizing a current data encryption key; and write the user data that is encrypted utilizing the current data encryption key to the storage device. Readers will appreciate that the firmware can also include computer program instructions that, when executed by the computer processor, cause the storage device (146, 150) to perform other functions as will be described in greater detail below, including all of the steps and functions described in the flowcharts that are included below The storage array controllers (106, 112) of FIG. 1 may be useful in periodically re-encrypting user data stored on a storage device according to embodiments of the present disclosure. The storage array controllers (106, 112) may assist in periodically re-encrypting user data stored on a storage device by performing various functions as will be described in greater detail below. The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Periodically re-encrypting user data stored on a storage device in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in periodically re-encrypting user data stored on a storage device according to embodiments of the present disclosure.

Figure 2:
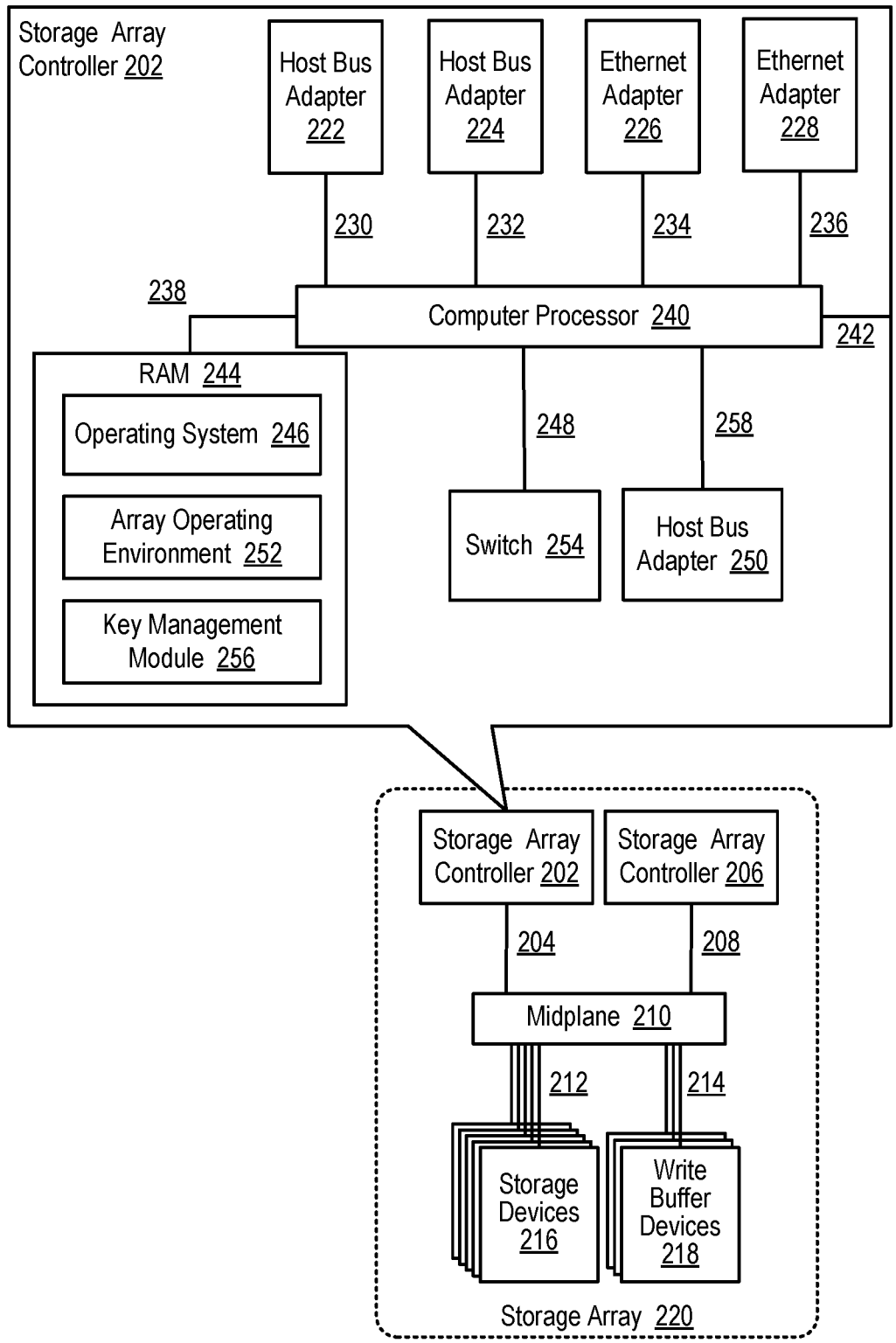
FIG. 2 sets forth a block diagram of a storage array controller useful in periodically re-encrypting user data stored on a storage device according to embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI (SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in periodically re-encrypting user data stored on a storage device according to embodiments of the present disclosure may include additional computer processors. Likewise, although the storage array controller (202) detailed in FIG. 2 includes only a RAM (244), readers will appreciate that storage array controllers useful in periodically re-encrypting user data stored on a storage device according to embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for periodically re-encrypting user data stored on a storage device according to embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a key management module (256), a module that includes computer program instructions useful in periodically re-encrypting user data stored on a storage device according to embodiments of the present disclosure. The key management module (256) may be useful in periodically re-encrypting user data stored on a storage device according to embodiments of the present disclosure by: detecting that a data encryption key should be decommissioned; and for user data stored on the storage device that is encrypted with the data encryption key: reading the user data that is encrypted with the data encryption key from the storage device; re-encrypting the user data utilizing a current data encryption key; and writing the user data that is encrypted utilizing the current data encryption key to the storage device. Readers will appreciate that key management module (256) may be useful in periodically re-encrypting user data stored on a storage device according to embodiments of the present disclosure by performing other functions as will be described in greater detail below, including all of the steps and functions described in the flowcharts that are included below.

The storage array controller (202) detailed in FIG. 2 also includes a plurality of host bus adapters (222, 224, 250) and Ethernet adapters (226, 228) that are coupled to the computer processor (240) via a data communications link (230, 232, 234, 236, 258). Each host bus adapter (222, 224, 250) and Ethernet adapter (226, 228) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as a Target Channel Adapter, as a SCSI/Storage Target Adapter, and so on. Each Ethernet adapter (226, 228) may enable the storage array controller (202) to connect to a LAN or other data communications network. Each of the host bus adapters (222, 224, 250) may be coupled to the computer processor (240) via a data communications link (230, 232, 234, 236, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
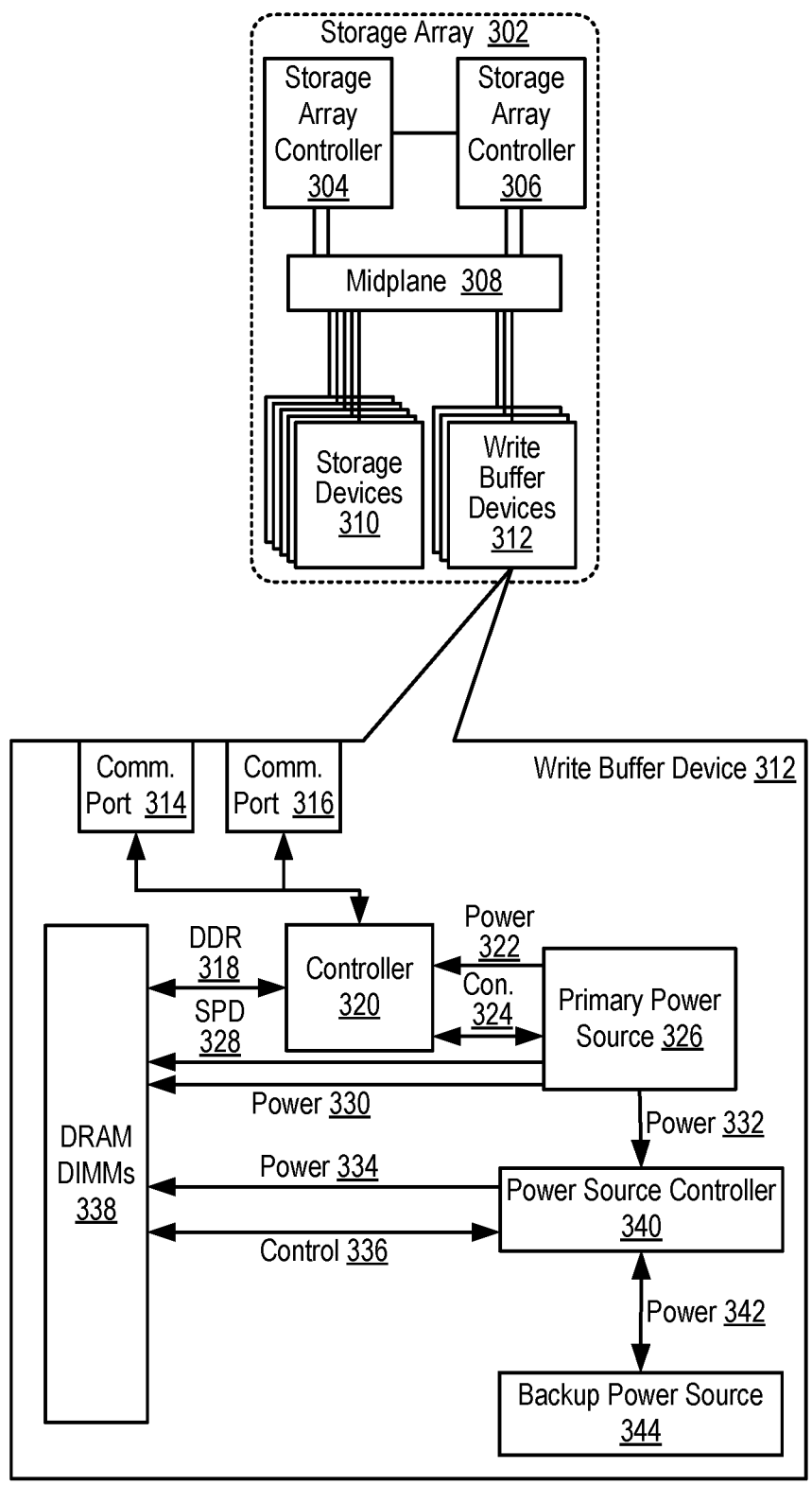
FIG. 3 sets forth a block diagram of a storage system configured for periodically re-encrypting user data stored on a storage device according to embodiments of the present disclosure.

For further explanation, FIG. 3 sets forth a block diagram illustrating a write buffer device (312) useful in periodically re-encrypting user data stored on a storage device according to embodiments of the present disclosure. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current (DC') power, as a DC-to-DC converter that converts a source of direct current (DC) from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM.

Readers will appreciate that although the examples described above include various system configurations, device configurations, and so on, the examples described above are included only for explanatory purposes. In fact, periodically re-encrypting user data stored on a storage device according to embodiments of the present disclosure may be carried out on storage devices that are different than the storage devices described above and on storage systems that are different than the storage systems described above. For example, storage systems configured for periodically re-encrypting user data stored on a storage device according to embodiments of the present disclosure may be carried out in storage systems that include no write cache, in storage systems that do not include a non-volatile write cache, on storage systems that where the components of the storage system are in the form factor of a blade computing device that includes processing resources, storage resources, or any combination thereof.

Figure 4:
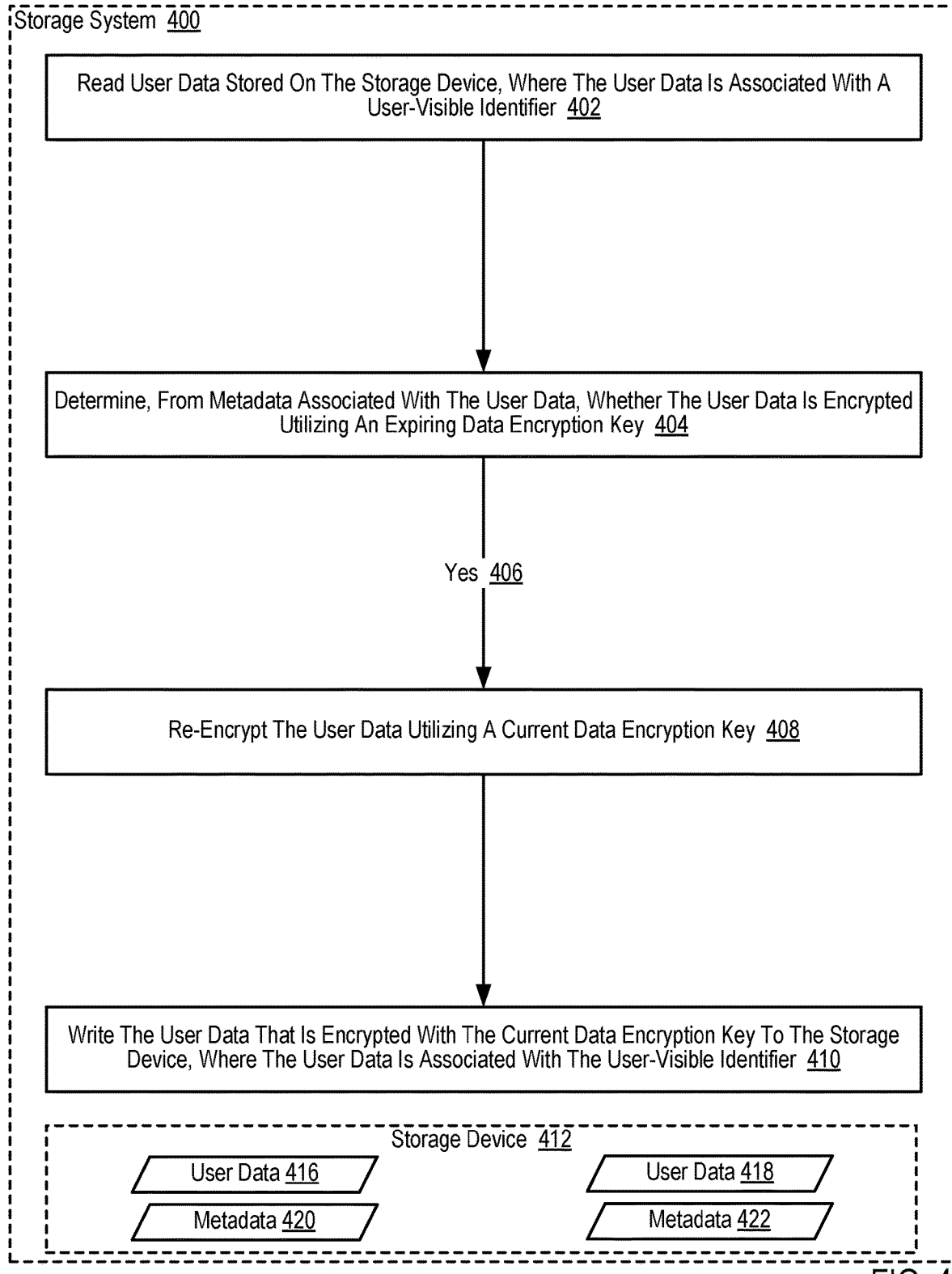
FIG. 4 sets forth a flow chart illustrating an example method for periodically re-encrypting user data stored on a storage device according to embodiments of the present disclosure.

For further explanation, FIG. 4 sets forth a flow chart illustrating an example method for periodically re-encrypting user data (416, 418) stored on a storage device (412) according to embodiments of the present disclosure. As described above, periodically re-encrypting user data (416, 418) stored on a storage device (412) may be carried out by one or more modules of computer program instructions executing on computer hardware such as a CPU, where the CPU is housed within a storage array controller as described above. Readers will appreciate that in other embodiments, periodically re-encrypting user data (416, 418) stored on a storage device (412) may be carried out by firmware within the storage device (412) itself. Such firmware may be executing on a computing device within the storage device (412) such as, for example, a memory controller, an ASIC, and so on.

The example method depicted in FIG. 4 includes reading (402) user data (416, 418) stored on the storage device (412). The user data (416) depicted in FIG. 4 may be embodied, for example, as data written to the storage device in response to a request from a user of the storage system (400). The user of the storage system (400) may send such a request to the storage system (400) via a SAN or other data communications link between the user and the storage system (400). In the example method depicted in FIG. 4, reading (402) user data (416, 418) stored on the storage device (412) may be carried out, for example, by a user of the storage system (400) issuing a read request, by a user of the storage system issuing a request to copy the user data from a first location within the storage system (400) to a second location within the storage system, by a system-level entity issuing a request to copy the user data from a first location within the storage system (400) to a second location within the storage system, by a system-level entity issuing a request to replicate the user data to a backup location within the storage system (400), and so on. Reading (402) user data (416, 418) stored on the storage device (412) may also be carried out as part of a garbage collection process that causes valid data to be copied from a first location within the storage system (400) and written to a second location within the storage system (400), so that the data storage that originally was used to store the user data can be erased and made available to users of the storage system (400).

In the example method depicted in FIG. 4, the user data (416, 418) that is stored on the storage device (412) may be associated with a user-visible identifier. A user-visible identifier may be embodied, for example, as an identifier that is used by a user of the storage system (400) to access data stored in the storage system (400). The user-visible identifier may be embodied, for example, as a logical address, as a volume identifier, as a volume identifier and offset within the volume, as a file name, and so on. Readers will appreciate that the user-visible identifier may be distinct from system-visible identifiers such as, for example, a physical address that is used by system processes to access data stored in the storage system (400). In such an example, mappings may exist that associate user-visible identifiers with system-visible identifiers. Through the use of such abstractions, user data may be moved from a first location within the storage system (400) to a second location within the storage system (400) in a way that is not visible to users of the storage system (400) such as computing devices that access the storage system (400) via a SAN.

The example method depicted in FIG. 4 also includes determining (404), from metadata (420) associated with the user data (416, 418), whether the user data (416, 418) is encrypted utilizing an expiring data encryption key. The metadata (420, 422) depicted in FIG. 4 may be embodied, for example, as data that describes and gives information about the user data (416, 418). The metadata (420, 422) depicted in FIG. 4 may include information such as, for example, an identifier of the data encryption key that was used to encrypt the user data (420, 422) that is described by the metadata (420, 422), a volume number and offset within the volume that is associated with the user data (420, 422) that is described by the metadata (420, 422), information describing whether the user data (420, 422) that is described by the metadata (420, 422) is still valid, and so on. Such metadata (420, 422) may be stored with the user data (416, 418) on the storage device (412). Such metadata (420, 422) may be stored with the user data (416, 418) on the storage device (412), for example, through the use of one or more small areas of storage referred to herein as a header that is attached to each page of storage in the storage device (412). In such an example, the pages in the storage device (412) may be used to store the user data (416, 418) whereas the header that is attached to each page may be used to store metadata (420, 422) that describes the user data stored in the attached page.

In the example method depicted in FIG. 4, the metadata (420, 422) that is stored within the storage system (400) may not be encrypted, but the user data (416, 418) that is stored within the storage system (400) may be encrypted using a data encryption key. A data encryption key may be embodied, for example, as a key designed to encrypt and decrypt data. Such a data encryption key may consist of a random string of bits created explicitly for scrambling and unscrambling data, and such a data encryption key may be designed through the use of algorithms intended to ensure that every data encryption key is unpredictable and unique. Readers will appreciate that user data (416, 418) stored within the storage device (412) may be encrypted using different data encryption keys. For example, some user data (416) may be encrypted using a first data encryption key while other user data (418) may be encrypted using a second data encryption key. Readers will appreciate that in alternative embodiments, the metadata (420, 422) that is stored within the storage system (400) may be encrypted with the same data encryption key as the user data (416, 418) or with a different data encryption key that is used to encrypt the user data (416, 418).

In order to protect user data (416, 418) that is stored within the storage system, data encryption keys may be decommissioned after the data encryption key has been used for a certain period of time, after the data encryption key has been used a certain number of times, after data encrypted with the data encryption key has been cracked, and so on. As such, there may be a lifecycle associated with the utilization of a particular data encryption key. During a first stage, the data encryption key may be utilized to encrypt data that is being written to the storage system (400). Such a data encryption key is referred to herein as a 'current' data encryption key. During a second stage, the data encryption key may no longer be utilized to encrypt data that is being written to the storage system (400) but valid data that is encrypted with the data encryption key may still reside within the storage system (400). Such a data encryption key is referred to herein as an 'expiring' data encryption key. During a third stage, the data encryption key may no longer be utilized to encrypt data that is being written to the storage system (400) and no valid data that is encrypted with the data encryption key may still reside within the storage system (400), although invalid data (i.e., garbage) that is encrypted with the data encryption key may still reside within the storage system (400). Such a data encryption key is referred to herein as an 'expired' data encryption key. Consider an example in which one or more system parameters specify that user data stored within the storage system (400) must be re-encrypted at least once a year. In such an example, a data encryption key may be created and used for a certain period of time (e.g., nine months) as a current data encryption key. In such an example, however, the data encryption key may be designated as an expiring data encryption key after the data encryption key has been used for nine months, such that any data that is written to the storage system (400) will not be encrypted using the expiring data encryption key.

In the example method depicted in FIG. 4, determining (404) whether the user data (416, 418) is encrypted utilizing an expiring data encryption key may be carried out, for example, by retrieving an identifier of the data encryption key that was utilized to encrypt the user data (416, 418) from the metadata (420, 422) that is associated with the user data (416, 418). In such an example, system software within the storage system (404), firmware on the storage device (412), or some other entity may retain information that associates current data encryption keys, expiring data encryption keys, and expired data encryption keys with identifiers of each data encryption key. In such an example, the identifier of the data encryption key that was utilized to encrypt the user data (416, 418) may be extracted from the metadata (420, 422) that is associated with the user data (416, 418) and compared to the information that associates current data encryption keys, expiring data encryption keys, and expired data encryption keys with identifiers of each data encryption key to determine whether the user data (416, 418) is encrypted utilizing an expiring data encryption key. Readers will appreciate that in other embodiments, other types of metadata (420, 422) such as the date at which the user data (416, 418) was encrypted with the data encryption key, a sequence number associated with a data written to the storage system, or some other type of metadata (420, 422) may be used and compared to other types of information (e.g., the date at which a data encryption key was initially used, the sequence number associated with some stored data) to determine (404) whether the user data (416, 418) is encrypted utilizing an expiring data encryption key.

The example method depicted in FIG. 4 also includes, in response to affirmatively (406) determining that the user data (416, 418) is encrypted utilizing the expiring data encryption key, re-encrypting (408) the user data (416, 418) utilizing a current data encryption key. In the example method depicted in FIG. 4, re-encrypting (408) the user data (416, 418) utilizing a current data encryption key may be carried out, for example, by decrypting the user data (416, 418) utilizing the expiring data encryption key and subsequently applying the current data encryption key utilizing to the unencrypted user data (416, 418). Readers will appreciate that although the examples described above relate to embodiments where a single current data encryption key is used, in other embodiments, there may be multiple current data encryption keys that are in use at a particular point in time. For example, the storage system (400) may be configured such that at any given point in time, there are eight current data encryption keys available for use in encrypting data that is to be written to the storage system (400).

The example method depicted in FIG. 4 also includes writing (410) the user data (416, 418) that is encrypted with the current data encryption key to the storage device (412). In the example method depicted in FIG. 4, writing (410) the user data (416, 418) that is encrypted with the current data encryption key to the storage device (412) may be carried out, for example, by issuing a write instruction, by writing the user data (416, 418) that is encrypted with the current data encryption key to the storage device (412) as part of a copy operation, by writing the user data (416, 418) that is encrypted with the current data encryption key to the storage device (412) as part of a replication operation, and so on. In addition, writing (410) the user data (416, 418) that is encrypted with the current data encryption key to the storage device (412) may be carried out as part of a garbage collection process that causes valid data to be copied from a first location within the storage system (400) and written to a second location within the storage system (400), so that the data storage that originally was used to store the user data can be erased and made available to users of the storage system (400).

In the example method depicted in FIG. 4, the user data (416, 418) that is encrypted with the current data encryption key remains associated with the user-visible identifier. As such, the re-encryption of the user data (416, 418) occurs in a way that is transparent to the user of the storage system, as the user of the storage system (400) may access the user data (416, 418) using the same user-visible identifier. Readers will appreciate, however, that re-encrypting (408) the user data (416, 418) utilizing a current data encryption key may cause metadata (420, 422) that is associated with the user data (416, 418) to change.

Figure 5:
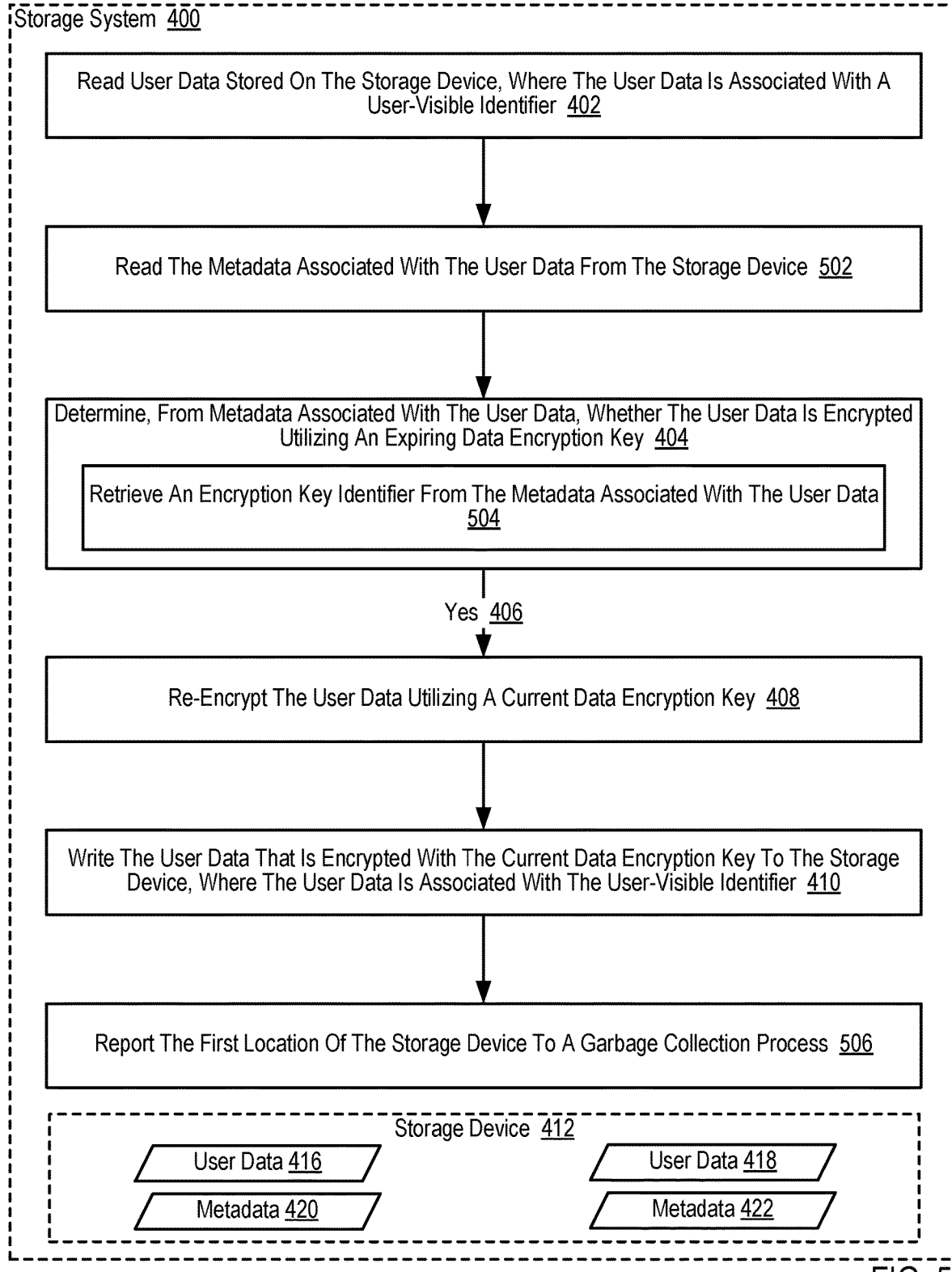
FIG. 5 sets forth a flow chart illustrating an additional example method for periodically re-encrypting user data stored on a storage device according to embodiments of the present disclosure.

For further explanation, FIG. 5 sets forth a flow chart illustrating an additional example method for periodically re-encrypting user data (416, 418) stored on a storage device (412) according to embodiments of the present disclosure. The example method depicted in FIG. 5 is similar to the example method depicted in FIG. 4, as the example method depicted in FIG. 5 also includes reading (402) user data (416, 418) stored on the storage device (412), determining (404), from metadata (420) associated with the user data (416), whether the user data (416) is encrypted utilizing an expiring data encryption key, re-encrypting (408) the user data (416) utilizing a current data encryption key, and writing (410) the user data (418) that is encrypted with the current data encryption key to the storage device (412).

The example method depicted in FIG. 5 also includes reading (502) the metadata (420, 422) associated with the user data (416, 418) from the storage device (412). In the example method depicted in FIG. 5, the storage system (400) may be configured such that the metadata (420, 422) that is associated with the user data (416, 418) may be read (502) from the storage device (412) each time that the user data (416, 418) is read. As such, the metadata (420) that is associated with the user data (416, 418) may be read (502) from the storage device (412), for example, when performing an operation to copy the user data (420, 422) from a first location within the storage system (400) to a second location within the storage system (400), when relocating the user data (420, 422) from a first location within the storage system (400) to a second location within the storage system (400) as part of a garbage collection process, and so on.

In the example method depicted in FIG. 5, determining (404), from metadata (420) associated with the user data (416, 418), whether the user data (416) is encrypted utilizing an expiring data encryption key can include retrieving (504) an encryption key identifier from the metadata (420, 422) associated with the user data (416, 418). The encryption key identifier may be embodied, for example, as an integer value or other value that is associated and used to identify a particular data encryption key. In the example method depicted in FIG. 5, system software within the storage system (400), firmware on the storage device (412), or some other entity may retain information that associates current data encryption keys, expiring data encryption keys, and expired data encryption keys with identifiers of each data encryption key. In such an example, the encryption key identifier for the data encryption key that was utilized to encrypt the user data (416, 418) may be extracted from the metadata (420, 422) that is associated with the user data (416, 418) and compared to the information that associates current data encryption keys, expiring data encryption keys, and expired data encryption keys with identifiers of each data encryption key to determine whether the user data (416, 418) is encrypted utilizing an expiring data encryption key.

In the example method depicted in FIG. 5, the user data (416, 418) that is encrypted utilizing the expiring data encryption key may be stored at a first location of the storage device (412) and the user data (416, 418) that is encrypted utilizing the current data encryption key may be stored at a second location of the storage device (412). Readers will appreciate that the user data (416, 418) that is encrypted utilizing the expiring data encryption key may be stored at a first location of the storage device (412) and the user data (416, 418) that is encrypted utilizing the current data encryption key may be stored at a second location of the storage device (412), for example, because the underlying storage device (412) may not support in-place overwrites of data. For example, the storage device (412) may be embodied as an SSD that does not support in-place overwrites of data. In an SSD, data cannot be directly overwritten as it can be in a hard disk drive. As such, the user data (416, 418) that is encrypted utilizing the current data encryption key must be stored at a second location of the storage device (412), rather than simply overwriting, at the first location, the user data (416, 418) that is encrypted utilizing the expiring data encryption key with the user data (416, 418) that is encrypted utilizing the current data encryption key. In such an example, the user data (416, 418) that is encrypted utilizing the expiring data encryption key and stored at the first location will be marked as being invalid, and the user data (416, 418) that is encrypted utilizing the expiring data encryption key and stored at the first location will ultimately be garbage collected. Readers will appreciate that in alternative embodiments, the user data (416, 418) that is encrypted utilizing the expiring data encryption key may be overwritten in place using the user data (416, 418) that is encrypted utilizing the current data encryption key.

The example method depicted in FIG. 5 also includes reporting (506) the first location of the storage device (412) to a garbage collection process. In the example method depicted in FIG. 5, reporting (506) the first location of the storage device (412) to a garbage collection process may be carried out, for example, by storing a first location of the storage device (412) in a table or other data structure that includes locations that need to be erased and subsequently made available to users of the storage system (400) during a garbage collection process, by sending a message to the garbage collection process that identifies the first location as being available for garbage collection, by updating metadata (420, 422) associated with the user data (416, 418) that is encrypted utilizing the expiring data encryption key and stored at a first location within the storage device (412) to indicate that the user data is no longer valid, and so on.

Figure 6:
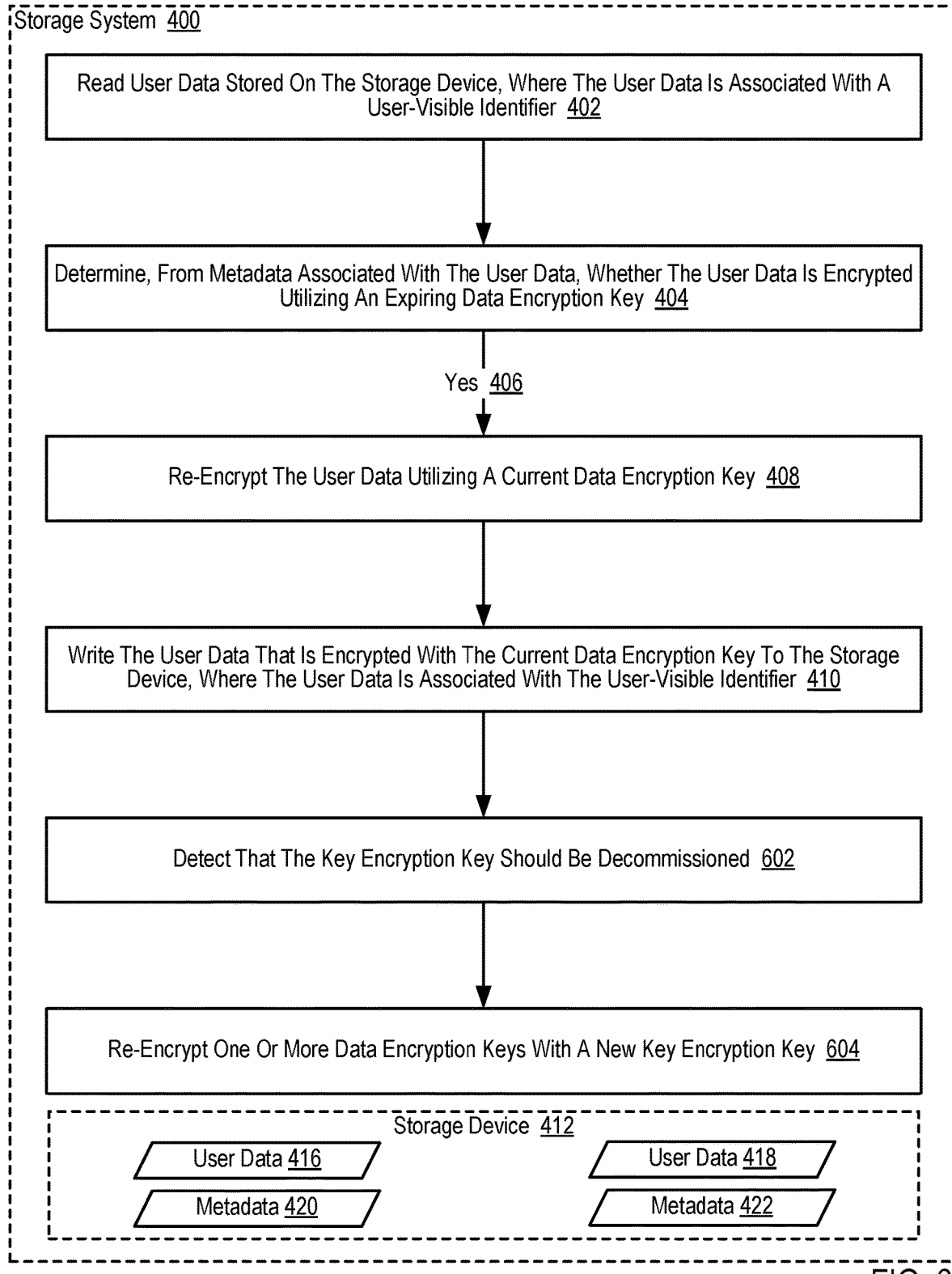
FIG. 6 sets forth a flow chart illustrating an additional example method for periodically re-encrypting user data stored on a storage device according to embodiments of the present disclosure.

For further explanation, FIG. 6 sets forth a flow chart illustrating an additional example method for periodically re-encrypting user data (416, 418) stored on a storage device (412) according to embodiments of the present disclosure. The example method depicted in FIG. 6 is similar to the example method depicted in FIG. 4, as the example method depicted in FIG. 6 also includes reading (402) user data (416, 418) stored on the storage device (412), determining (404), from metadata (420) associated with the user data (416), whether the user data (416) is encrypted utilizing an expiring data encryption key, re-encrypting (408) the user data (416) utilizing a current data encryption key, and writing (410) the user data (418) that is encrypted with the current data encryption key to the storage device (412).

In the example method depicted in FIG. 6, and as described above, user data (416, 418) stored on the storage device (412) may be encrypted using one of a plurality of available data encryption keys. Each of the data encryption keys may in turn be encrypted using a key encryption key. The key encryption key may be embodied, for example, as a key designed to encrypt and decrypt a data encryption key. In the example method depicted in FIG. 6, the key encryption key may be split across multiple storage devices within the storage system (400), such that acquiring the key encryption key requires accessing multiple storage devices.

The example method depicted in FIG. 6 also includes detecting (602) that the key encryption key should be decommissioned. Detecting (602) that the key encryption key should be decommissioned may be carried out, for example, by determining whether the key encryption key has been utilized for a threshold period of time after which a new key encryption key should be used, by determining whether the key encryption key has been utilized a threshold number of times after which a new key encryption key should be used, by determining whether the key encryption key has been cracked, in response to a request to use a new key encryption key, and so on.

The example method depicted in FIG. 6 also includes re-encrypting (604) one or more data encryption keys with a new key encryption key. In the example method depicted in FIG. 6, re-encrypting (604) one or more data encryption keys with a new key encryption key may be carried out, for example, in response to affirmatively determining that the one or more key encryption keys is encrypted utilizing an expiring key encryption key. Re-encrypting (604) one or more data encryption keys with a new key encryption key may be carried out, for example, by decrypting the data encryption key using the expiring key encryption key and encrypting the un-encrypted data encryption key with the new key encryption key.

Figure 7:
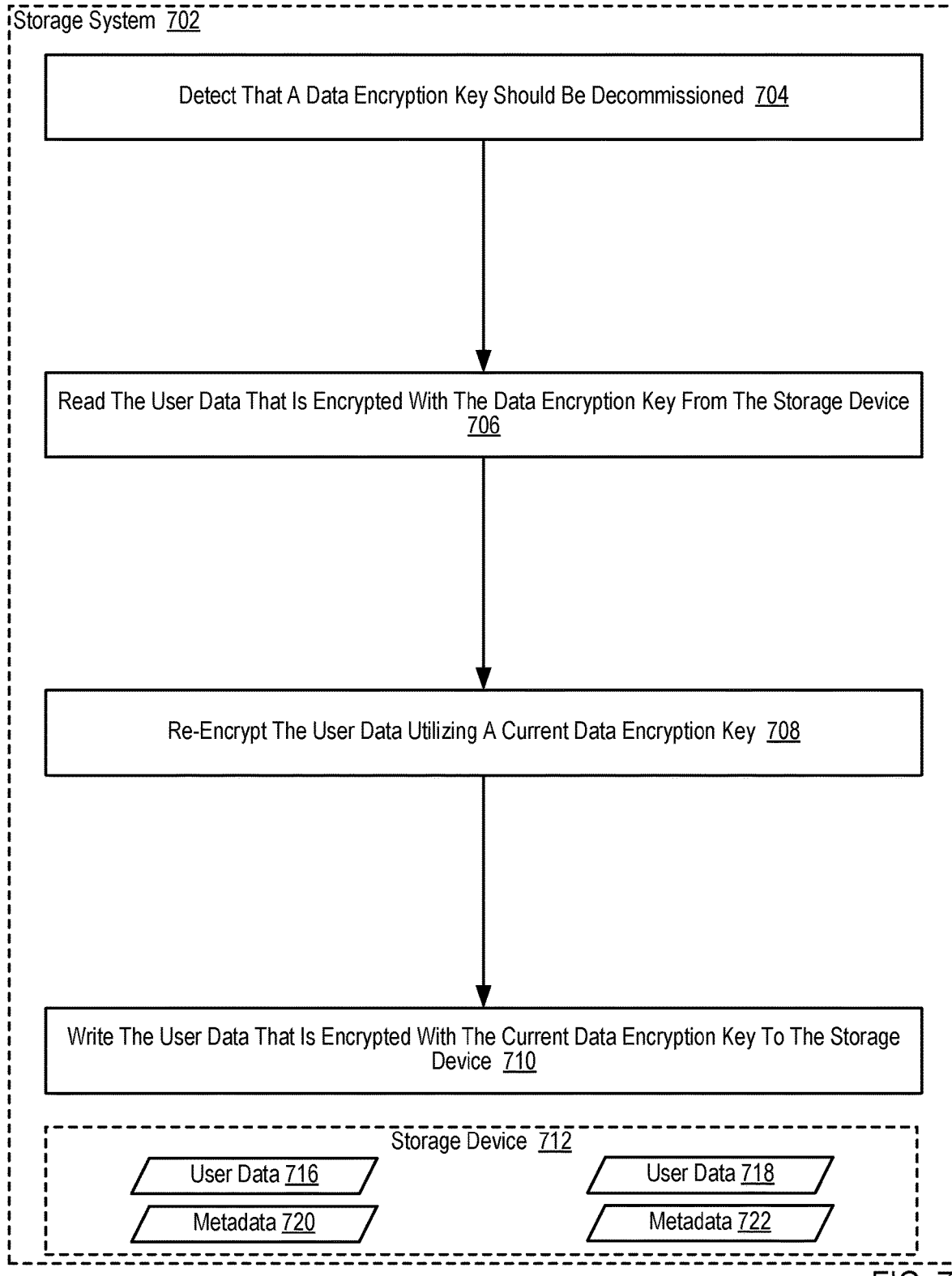
FIG. 7 sets forth a flow chart illustrating an additional example method for periodically re-encrypting user data stored on a storage device according to embodiments of the present disclosure.

For further explanation, FIG. 7 sets forth an additional example method of periodically re-encrypting user data stored on a storage device (712) according to embodiments of the present disclosure. As described above, periodically re-encrypting user data stored on a storage device (712) may be carried out by one or more modules of computer program instructions executing on computer hardware such as a CPU, where the CPU is housed within a storage array controller as described above. Readers will appreciate that in other embodiments, periodically re-encrypting user data stored on a storage device (712) may be carried out by firmware within the storage device (712) itself. Such firmware may be executing on a computing device within the storage device (712) such as, for example, a memory controller, an ASIC, and so on.

The example method depicted in FIG. 7 includes detecting (704) that a data encryption key should be decommissioned. In order to protect user data (716, 718) that is stored within the storage system (702), data encryption keys may be decommissioned after the data encryption key has been used for a certain period of time, after the data encryption key has been used a certain number of times, after data encrypted with the data encryption key has been cracked, and so on. As such, there may be a lifecycle associated with the utilization of a particular data encryption key. During a first stage, the data encryption key may be utilized to encrypt user data that is being written to the storage system (702). Such a data encryption key is referred to herein as a 'current' data encryption key. During a second stage, the data encryption key may no longer be utilized to encrypt user data that is being written to the storage system (702) but valid user data that is encrypted with the data encryption key may still reside within the storage system (702). Such a data encryption key is referred to herein as an 'expiring' data encryption key. During a third stage, the data encryption key may no longer be utilized to encrypt user data that is being written to the storage system (702) and no valid user data that is encrypted with the data encryption key may still reside within the storage system (702), although invalid user data (i.e., garbage) that is encrypted with the data encryption key may still reside within the storage system (702). Such a data encryption key is referred to herein as an 'expired' data encryption key. In the example method depicted in FIG. 7, detecting (704) that a data encryption key should be decommissioned may be carried out, for example, by determining that the data encryption key has been used for a certain period of time, by determining that the data encryption key has been used a certain number of times, by determining that the data encryption key has been cracked, and so on.

The example method depicted in FIG. 7 includes, for user data (716, 718) stored on the storage device (712) that is encrypted with the data encryption key that should be decommissioned, reading (706) the user data (716, 718) that is encrypted with the data encryption key from the storage device (712). Reading (706) the user data (716, 718) that is encrypted with the data encryption key that should be decommissioned may be carried out, for example, by a user of the storage system issuing a request to copy the user data (716, 718) from a first location within the storage system (702) to a second location within the storage system (702), by a system-level entity issuing a request to copy the user data from a first location within the storage system (702) to a second location within the storage system, by a system-level entity issuing a request to replicate the user data to a backup location within the storage system (702), and so on. Reading (706) the user data (716, 718) that is encrypted with the data encryption key that should be decommissioned may be carried out, for example, as part of a garbage collection process that causes valid data to be copied from a first location within the storage system (702) and written to a second location within the storage system (702), so that the data storage that originally was used to store the user data can be erased and made available to users of the storage system (702).

The example method depicted in FIG. 7 includes, for user data (716, 718) stored on the storage device (712) that is encrypted with the data encryption key that should be decommissioned, re-encrypting (708) the user data (716, 718) utilizing a current data encryption key. In example method depicted in FIG. 7 includes, re-encrypting (708) the user data (716, 718) utilizing a current data encryption key may be carried out, for example, by decrypting the user data (716, 718) using the data encryption key that should be decommissioned and encrypting the un-encrypted user data (716, 718) utilizing the current data encryption key. Such a current data encryption key may be selected from a plurality of current data encryption keys, where the current data encryption key may have been utilized for less than a predetermined period of time, utilized less than a predetermined number of times, and so on.

The example method depicted in FIG. 7 includes, for user data (716, 718) stored on the storage device (712) that is encrypted with the data encryption key that should be decommissioned, writing (710) the user data (716, 718) that is encrypted utilizing the current data encryption key to the storage device (712). In the example method depicted in FIG. 7, writing (710) the user data (716, 718) that is encrypted utilizing the current data encryption key to the storage device (712) may be carried out, for example, by issuing a write instruction, by writing (710) the user data (716, 718) that is encrypted utilizing the current data encryption key as part of a copy operation, by writing (710) the user data (716, 718) that is encrypted utilizing the current data encryption key to the storage device (712) as part of a replication operation, and so on. In addition, writing (710) the user data (716, 718) that is encrypted utilizing the current data encryption key to the storage device (712) may be carried out as part of a garbage collection process that causes valid data to be copied from a first location within the storage system (702) and written to a second location within the storage system (702), so that the data storage that originally was used to store the user data can be erased and made available to users of the storage system (702).

Figure 8:
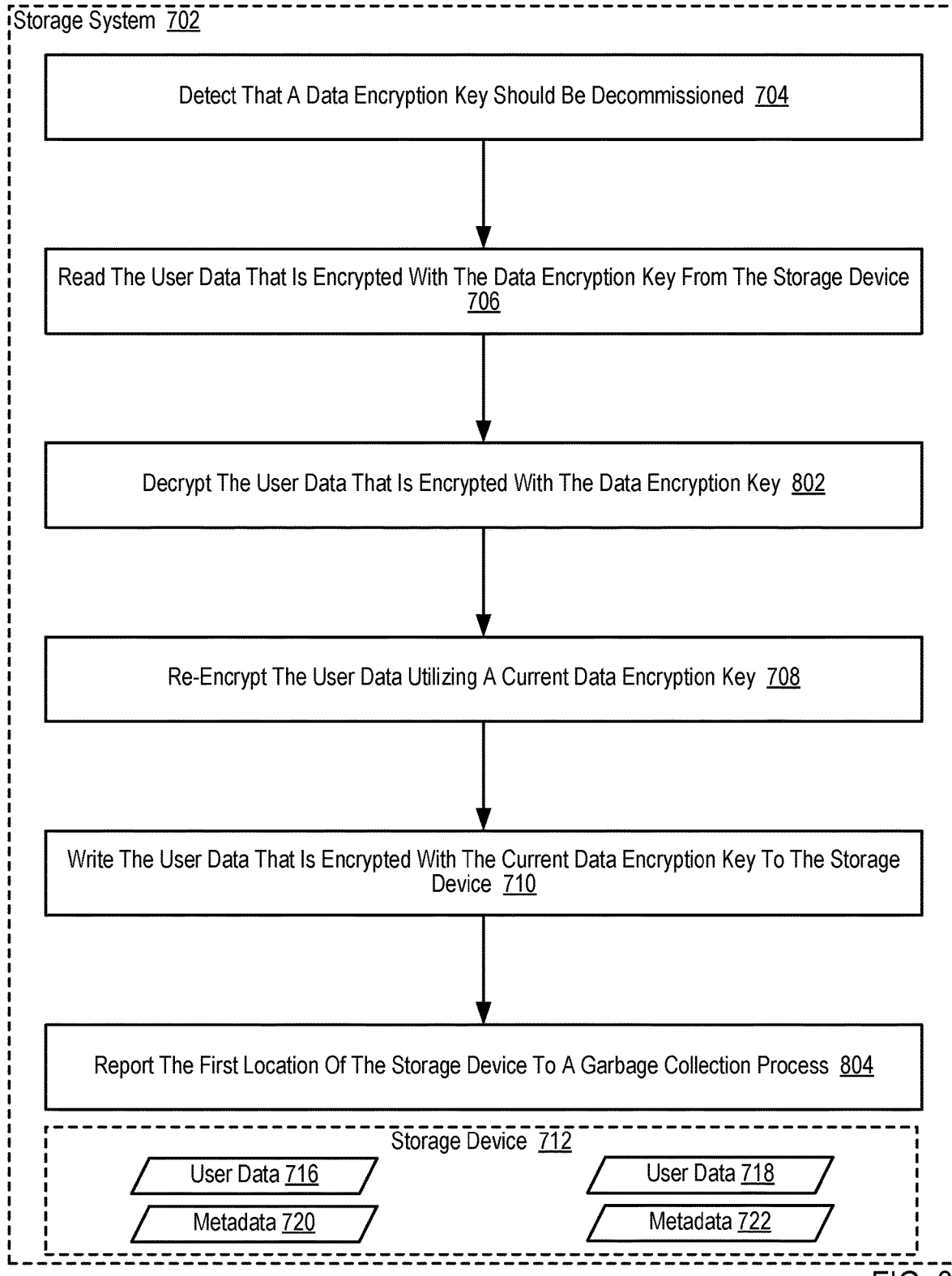
FIG. 8 sets forth a flow chart illustrating an additional example method for periodically re-encrypting user data stored on a storage device according to embodiments of the present disclosure.

For further explanation, FIG. 8 sets forth an additional example method of periodically re-encrypting user data stored on a storage device (712) according to embodiments of the present disclosure. The example method depicted in FIG. 8 is similar to the example method depicted in FIG. 7, as the example method depicted in FIG. 8 also includes detecting (704) that a data encryption key should be decommissioned, reading (706) the user data (716, 718) that is encrypted with the data encryption key from the storage device (712), re-encrypting (708) the user data utilizing a current data encryption key, and writing (710) the user data (716, 718) that is encrypted utilizing the current data encryption key to the storage device (712).

The example method depicted in FIG. 8 also includes decrypting (802) the user data (716, 718) that is encrypted with the data encryption key that should be decommissioned. Decrypting (802) the user data (716, 718) that is encrypted with the data encryption key that should be decommissioned may be carried out, for example, by taking the user data (716, 718) that is encrypted with the data encryption key that should be decommissioned and converting it back into data that a computer, and potentially even a user, can read and understand.

In the example method depicted in FIG. 8, the user data (716, 718) that is encrypted utilizing the data encryption key that should be commissioned may be stored at a first location of the storage device (712) and the user data (716, 718) that is encrypted utilizing the current data encryption key may be stored at a second location of the storage device (712). Readers will appreciate that the user data (716, 718) that is encrypted utilizing the data encryption key that should be commissioned may be stored at a first location of the storage device (712) and the user data (716, 718) that is encrypted utilizing the current data encryption key may be stored at a second location of the storage device (712), for example, because the underlying storage device (712) may not support in-place overwrites of data. For example, the storage device (712) may be embodied as an SSD that does not support in-place overwrites of data. In an SSD, data cannot be directly overwritten as it can be in a hard disk drive. As such, the user data (716, 718) that is encrypted utilizing the current data encryption key must be stored at a second location of the storage device (712), rather than simply overwriting, at the first location, the user data (716, 718) that is encrypted utilizing the data encryption key that should be commissioned with the user data (716, 718) that is encrypted utilizing the current data encryption key. In such an example, the user data (716, 718) that is encrypted utilizing the data encryption key that should be commissioned and stored at the first location will be marked as being invalid, and the user data (716, 718) that is encrypted utilizing the data encryption key that should be commissioned and stored at the first location will ultimately be garbage collected.

The example method depicted in FIG. 8 also includes reporting (804) the first location of the storage device (712) to a garbage collection process. In the example method depicted in FIG. 8, reporting (804) the first location of the storage device (712) to a garbage collection process may be carried out, for example, by storing a first location of the storage device (712) in a table or other data structure that includes locations that need to be erased and subsequently made available to users of the storage system (702) during a garbage collection process, by sending a message to the garbage collection process that identifies the first location as being available for garbage collection, by updating metadata (720, 722) associated with the user data (716, 718) that is encrypted utilizing the data encryption key that should be decommissioned and stored at a first location within the storage device (712) to indicate that the user data is no longer valid, and so on.

Figure 9:
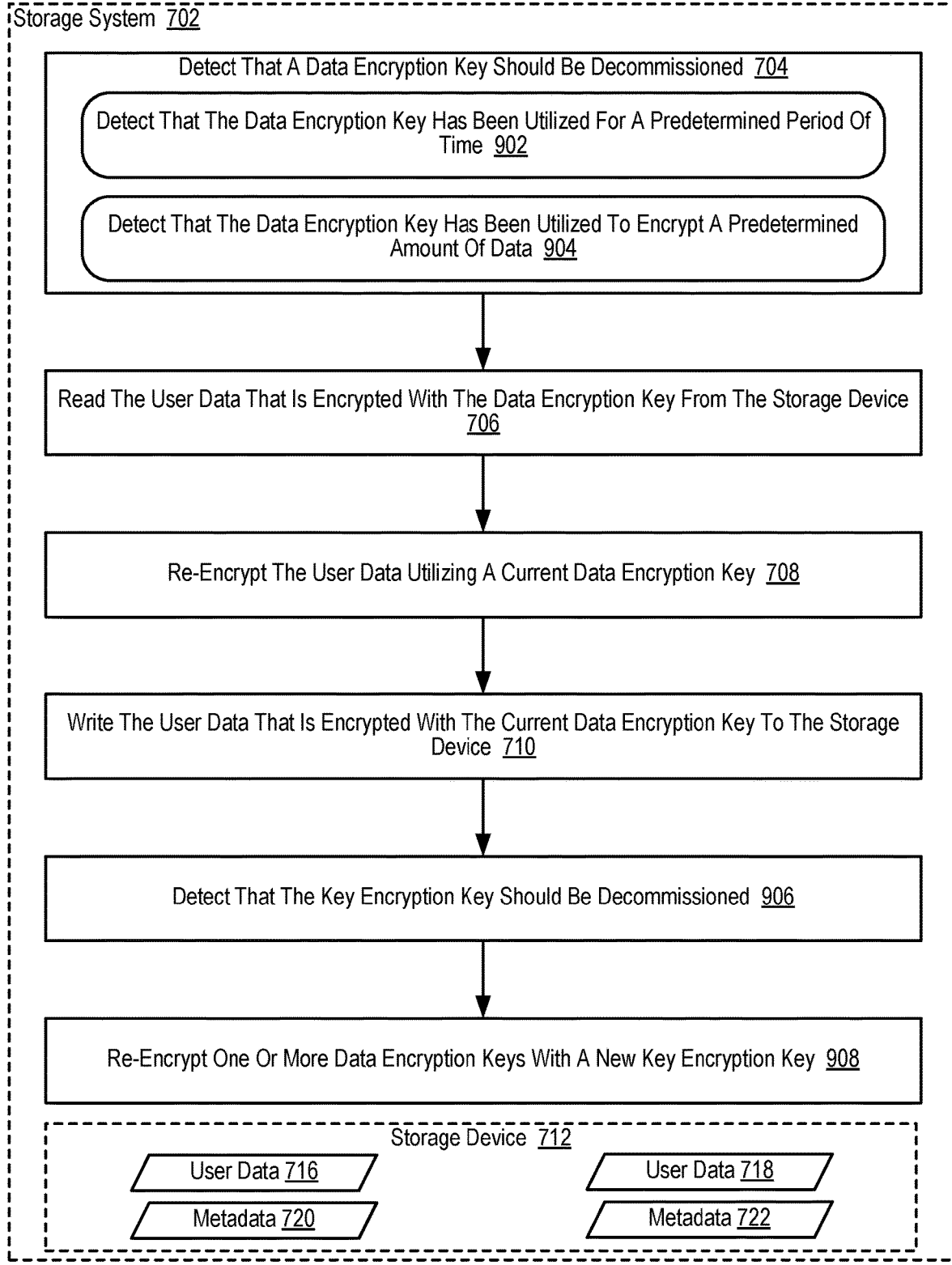
FIG. 9 sets forth a flow chart illustrating an additional example method for periodically re-encrypting user data stored on a storage device according to embodiments of the present disclosure.

For further explanation, FIG. 9 sets forth an additional example method of periodically re-encrypting user data stored on a storage device (712) according to embodiments of the present disclosure. The example method depicted in FIG. 9 is similar to the example method depicted in FIG. 7, as the example method depicted in FIG. 9 also includes detecting (704) that a data encryption key should be decommissioned, reading (706) the user data (716, 718) that is encrypted with the data encryption key from the storage device (712), re-encrypting (708) the user data utilizing a current data encryption key, and writing (710) the user data (716, 718) that is encrypted utilizing the current data encryption key to the storage device (712).

In the example method depicted in FIG. 9, detecting (704) that a data encryption key should be decommissioned can include detecting (902) that the data encryption key has been utilized for a predetermined period of time. Detecting (902) that the data encryption key has been utilized for a predetermined period of time may be carried, for example, through the usage of age information associated with each data encryption that identifies the point in time at which the data encryption key was created or otherwise put into use. Such information may be maintained, for example, by firmware on the storage device (712) itself, by one or more system management modules, or elsewhere in the storage system (702).

In the example method depicted in FIG. 9, detecting (704) that a data encryption key should be decommissioned can include detecting (904) that the data encryption key has been utilized to encrypt a predetermined amount of data. Detecting (904) that the data encryption key has been utilized to encrypt a predetermined amount of data may be carried out, for example, through the usage of a counter or other information associated with each data encryption that identifies the amount of data that has been encrypted utilizing a particular data encryption key. In such an example, each time additional data is encrypted utilizing the particular data encryption key, the counter or other information associated with each data encryption may be increased by the size of the additional data. Such information may be maintained, for example, by firmware on the storage device (712) itself, by one or more system management modules, or elsewhere in the storage system (702).

In the example method depicted in FIG. 9, and as described above, user data (716, 718) stored on the storage device (412) may be encrypted using one of a plurality of available data encryption keys. Each of the data encryption keys may in turn be encrypted using a key encryption key. The key encryption key may be embodied, for example, as a key designed to encrypt and decrypt a data encryption key. In the example method depicted in FIG. 9, the key encryption key may be split across multiple storage devices within the storage system (702), such that acquiring the key encryption key requires accessing multiple storage devices.

The example method depicted in FIG. 9 also includes detecting (906) that the key encryption key should be decommissioned. Detecting (906) that the key encryption key should be decommissioned may be carried out, for example, by determining whether the key encryption key has been utilized for a threshold period of time after which a new key encryption key should be used, by determining whether the key encryption key has been utilized a threshold number of times after which a new key encryption key should be used, by determining whether the key encryption key has been cracked, in response to a request to use a new key encryption key, and so on.

The example method depicted in FIG. 9 also includes re-encrypting (908) one or more data encryption keys with a new key encryption key. In the example method depicted in FIG. 9, re-encrypting (908) one or more data encryption keys with a new key encryption key may be carried out, for example, in response to affirmatively determining that the one or more key encryption keys is encrypted utilizing an expiring key encryption key. Re-encrypting (908) one or more data encryption keys with a new key encryption key may be carried out, for example, by decrypting the data encryption key using the expiring key encryption key and encrypting the un-encrypted data encryption key with the new key encryption key.

Readers will appreciate that by performing the steps described above, operation of a storage system or an individual storage device may be improved as user data stored within the storage system or on an individual storage device may be more secure through the use of periodic re-encryption. Readers will appreciate that although the example methods described above are depicted in a way where a series of steps occurs in a particular order, no particular ordering of the steps is required unless explicitly stated. Example embodiments of the present disclosure are described largely in the context of a fully functional computer system for periodically re-encrypting user data stored on a storage device. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure. In fact, embodiments may include a system, a method, a computer program product, or others. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   detecting that a data encryption key should be decommissioned; and
   determining, by a garbage collection process, that user data stored in a first location of a storage device is encrypted with the data encryption key:
      reading the user data that is encrypted with the data encryption key from the first location of the storage device;
      re-encrypting the user data utilizing a current data encryption key; and
      writing the user data that is encrypted utilizing the current data encryption key to a second location of the storage device.

2. The method of claim 1 wherein:
   the user data that is encrypted utilizing the data encryption key is stored at a first location of the storage device; and
   the user data that is encrypted utilizing the current data encryption key is stored at a second location of the storage device.

3. The method of claim 2 further comprising reporting the first location of the storage device to a garbage collection process.

4. The method of claim 1 further comprising decrypting the user data that is encrypted with the data encryption key.

5. The method of claim 1 wherein detecting that the data encryption key should be decommissioned further comprises detecting that the data encryption key has been utilized for a predetermined period of time.

6. The method of claim 1 wherein detecting that the data encryption key should be decommissioned further comprises detecting that the data encryption key has been utilized to encrypt a predetermined amount of data.

7. The method of claim 1 wherein each data encryption key is encrypted with a key encryption key.

8. The method of claim 7 further comprising:
   detecting that the key encryption key should be decommissioned; and
   re-encrypting one or more data encryption keys with a new key encryption key.

9. A storage device that includes a computer processor and a computer memory, the computer memory including computer program instructions that, when executed by the computer processor, cause the storage device to carry out the steps of:
   detecting that a data encryption key should be decommissioned; and
   determining, by a garbage collection process, that user data stored in a first location of the storage device is encrypted with the data encryption key:
      reading the user data that is encrypted with the data encryption key from the first location of the storage device;
      re-encrypting the user data utilizing a current data encryption key; and
      writing the user data that is encrypted utilizing the current data encryption key to a second location of the storage device.

10. The storage device of claim 9 wherein:
    the user data that is encrypted utilizing the data encryption key is stored at a first location of the storage device; and
    the user data that is encrypted utilizing the current data encryption key is stored at a second location of the storage device.

11. The storage device of claim 10 further comprising computer program instructions that, when executed by the computer processor, cause the storage device to carry out the step of reporting the first location of the storage device to a garbage collection process.

12. The storage device of claim 9 further comprising computer program instructions that, when executed by the computer processor, cause the storage device to carry out the steps of decrypting the user data that is encrypted with the data encryption key.

13. The storage device of claim 9 wherein each data encryption key is encrypted with a key encryption key.

14. The storage device of claim 9 further comprising computer program instructions that, when executed by the computer processor, cause the storage device to carry out the steps of:
    detecting that the key encryption key should be decommissioned; and
    re-encrypting one or more data encryption keys with a new key encryption key.

15. A storage system that includes a plurality of storage devices, the storage system including a computer processor and a computer memory, the computer memory including computer program instructions that, when executed by the computer processor, cause the computer processor to carry out the steps of:
    detecting that a data encryption key should be decommissioned; and
    determining, by a garbage collection process, that user data stored in a first location of the storage system is encrypted with the data encryption key:
       reading the user data that is encrypted with the data encryption key from the first location of the storage system;
       re-encrypting the user data utilizing a current data encryption key; and
       writing the user data that is encrypted utilizing the current data encryption key to a second location of the storage system.

16. The storage system of claim 15 further comprising computer program instructions that, when executed by the computer processor, cause the computer processor to carry out the steps of:

the user data that is encrypted utilizing the data encryption key is stored at a first location in the storage system; and the user data that is encrypted utilizing the current data encryption key is stored at a second location in the storage system.

17. The storage system of claim 15 further comprising computer program instructions that, when executed by the computer processor, cause the computer processor to carry out the step of reporting the first location to a garbage collection process.

18. The storage system of claim 15 further comprising computer program instructions that, when executed by the computer processor, cause the computer processor to carry out the step of decrypting the user data that is encrypted with the data encryption key.

19. The storage system of claim 15 wherein each data encryption key is encrypted with a key encryption key.

20. The storage system of claim 19 further comprising computer program instructions that, when executed by the computer processor, cause the computer processor to carry out the steps of:

detecting that the key encryption key should be decommissioned; and re-encrypting one or more data encryption keys with a new key encryption key.

* * * * *